United States Patent
Patel et al.

(10) Patent No.: US 8,897,941 B2
(45) Date of Patent: Nov. 25, 2014

(54) MOTOR OPERATION CONTROL SYSTEM FOR AN ELECTRICALLY VARIABLE TRANSMISSION

(75) Inventors: Nadirsh Patel, Farmington Hills, MI (US); Goro Tamai, West Bloomfield, MI (US); Ashish Krupadanam, Cupertino, CA (US)

(73) Assignee: Chrysler Group LLC, Auburn Hills, MI (US)

(*) Notice: Subject to any disclaimer, the term of this patent is extended or adjusted under 35 U.S.C. 154(b) by 171 days.

(21) Appl. No.: 13/545,471

(22) Filed: Jul. 10, 2012

(65) Prior Publication Data

US 2013/0030628 A1      Jan. 31, 2013

Related U.S. Application Data

(60) Provisional application No. 61/513,112, filed on Jul. 29, 2011.

(51) Int. Cl.
| | |
|---|---|
| *B60L 9/00* | (2006.01) |
| *B60W 20/00* | (2006.01) |
| *B60K 6/445* | (2007.10) |
| *B60W 10/08* | (2006.01) |

(52) U.S. Cl.
CPC ....... *B60W 20/00* (2013.01); *B60W 2710/0666* (2013.01); *B60W 2710/0672* (2013.01); *B60K 6/445* (2013.01); *B60W 10/08* (2013.01); *B60W 2510/0275* (2013.01); *B60W 2510/244* (2013.01); *B60W 2710/083* (2013.01); *Y02T 10/6239* (2013.01)
USPC .................. 701/22; 701/54; 701/84

(58) Field of Classification Search
CPC ................ B60W 20/00; B60W 10/08; B60W 2710/0666; B60W 2710/0672
USPC ................................................ 701/22, 54, 84
See application file for complete search history.

(56) References Cited

U.S. PATENT DOCUMENTS

| | | | | |
|---|---|---|---|---|
| 5,453,930 | A * | 9/1995 | Imaseki et al. ................... | 701/22 |
| 7,104,347 | B2 * | 9/2006 | Severinsky et al. ........ | 180/65.23 |
| 8,781,664 | B2 * | 7/2014 | Sujan et al. ...................... | 701/22 |
| 2005/0038577 | A1 * | 2/2005 | Dreibholz et al. .............. | 701/22 |
| 2005/0255964 | A1 | 11/2005 | Heap et al. | |
| 2005/0256623 | A1 | 11/2005 | Hubbard et al. | |
| 2009/0115350 | A1 | 5/2009 | Heap | |
| 2009/0118080 | A1 * | 5/2009 | Heap et al. ......................... | 477/3 |
| 2009/0118924 | A1 | 5/2009 | Hsieh et al. | |
| 2009/0118950 | A1 * | 5/2009 | Heap et al. ...................... | 701/55 |
| 2010/0167869 | A1 * | 7/2010 | Falkenstein et al. .............. | 477/3 |

FOREIGN PATENT DOCUMENTS

GB        2453217     *   1/2009    ............ B60W 10/04

OTHER PUBLICATIONS

Merriam-Webster's Collegiate Dictionary, 10th Edition, 1993.*
International Search Report dated Nov. 7, 2012 for International Application No. PCT/US2012/047945, International Filing Date Jul. 24, 2012.
Written Opinion dated Nov. 7, 2012 for International Application No. PCT/US2012/047945, International Filing Date Jul. 24, 2012.

* cited by examiner

*Primary Examiner* — Calvin Cheung
(74) *Attorney, Agent, or Firm* — Ralph E Smith

(57) ABSTRACT

A motor operation control system and method for controlling first and second electric motors of an electrically variable transmission. The system and method determine a minimum battery power associated with a torque of the second electric motor, set the torque of the second electric motor based on the determined minimum battery power, and set a torque of the first electric motor based on the determined minimum battery power.

16 Claims, 7 Drawing Sheets

| POINT (S) | DESCRIPTION |
|---|---|
| A | VEHICLE STARTS IN IB-EV MODE. MOTORS A AND B PROPEL THE VEHICLE |
| A TO B | VEHICLE OPERATES IN IB-EV MODE. MOTORS A AND B PROPEL THE VEHICLE |
| B | IB-EV TO OD-EV SHIFT. MOTOR B PROPELS THE VEHICLE |
| B TO C | OD-EV MODE. MOTOR B PROPELS THE VEHICLE. MOTOR A ACCELERATES THE ENGINE |
| C | ENGINE STARTS. OD-EV TO OD-EO TRANSITION |
| C TO D | OD-EO MODE. ENGINE AND MOTORS PROPEL THE VEHICLE |
| D | OD-EO TO UD-EO SHIFT |
| D TO E | UD-EO MODE. ENGINE AND MOTORS PROPEL THE VEHICLE. HIGHER RATIO FROM ENGINE TO OUTPUT |
| E | UD-EO TO OD-EO SHIFT |
| E TO F | OD-EO MODE. ENGINE AND MOTORS PROPEL THE VEHICLE. LOWER RATIO FROM ENGINE TO OUTPUT |
| F | ENGINE SHUT-OFF. OD-EO TO OD-EV TRANSITION. MOTOR B PROPELS THE VEHICLE OR PROVIDES REGENERATIVE BRAKING AS NEEDED |
| F TO G | OD-EV MODE. MOTOR B PROPELS THE VEHICLE OR PROVIDES REGENERATIVE BRAKING AS NEEDED. MOTOR A SPINS ENGINE DOWN TO ZERO SPEED |
| G | OD-EV TO IB-EV SHIFT. BOTH MOTORS A AND B PROVIDE REGENERATIVE BRAKING (OR PROPULSION) AS NEEDED |
| G TO H | IB-EV MODE. BOTH MOTORS A AND B PROVIDE REGENERATIVE BRAKING (OR PROPULSION) AS NEEDED |
| H | VEHICLE STOPS IN IB-EV MODE |

FIG. 3

MOTOR OPERATION CONTROL SYSTEM FOR AN ELECTRICALLY VARIABLE TRANSMISSION

CROSS-REFERENCE TO RELATED APPLICATION

This application claims the benefit of U.S. Provisional Application No. 61/513,112, filed Jul. 29, 2011.

FIELD

The present disclosure relates to the control of an automotive transmission, specifically to a motor operation control system and method for a vehicle having an electrically variable transmission.

BACKGROUND

Some current hybrid electrically variable transmissions feature two electric motors coupled to an internal combustion engine utilizing a plurality of clutches and gear sets. At certain times it is desirable to operate the transmissions in strictly an electric mode or in a hybrid mode where the internal combustion engine and one or both motors operate simultaneously. Managing the many parameters such as clutch, engine and motor torques, battery power levels and usage, efficiency and smooth shifting between the various gears and drive modes, fuel economy, operational-cost efficiency, etc. pose many operational control challenges.

Thus, there remains a need for continuous improvement in the operational control of hybrid electrically variable transmissions.

SUMMARY

In one form, the present disclosure provides a method of controlling first and second electric motors of a vehicle having an electrically variable transmission. The method comprises using a processor to perform the steps of determining minimum and maximum torque limits for the second electric motor, determining a minimum battery power associated with a torque of the second electric motor, setting the torque of the second electric motor based on the determined minimum battery power and setting a torque of the first electric motor based on the determined minimum battery power.

The present disclosure also provides a controller for controlling first and second electric motors of a vehicle having an electrically variable transmission. The controller comprises a processor programmed to determine minimum and maximum torque limits for the second electric motor, determine a minimum battery power associated with a torque of the second electric motor, set the torque of the second electric motor based on the determined minimum battery power and set a torque of the first electric motor based on the determined minimum battery power.

In one aspect, the method and/or controller determines minimum and maximum torque limits for the first electric motor and determines the minimum and maximum torque limits for the second electric motor based in part on the determined minimum and maximum torque limits for the first electric motor and additional torque limitations of the second electric motor. In another aspect, the minimum and maximum torque limits for the first electric motor are based on input brake clutch limits and additional torque limitations of the first electric motor.

In yet another aspect, the method and/or controller ensure that the determined a minimum battery power falls within an allowable battery power range.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 3 is a table describing the various drive cycle points illustrated in FIG. 2;

DETAILED DESCRIPTION

Figure 1:
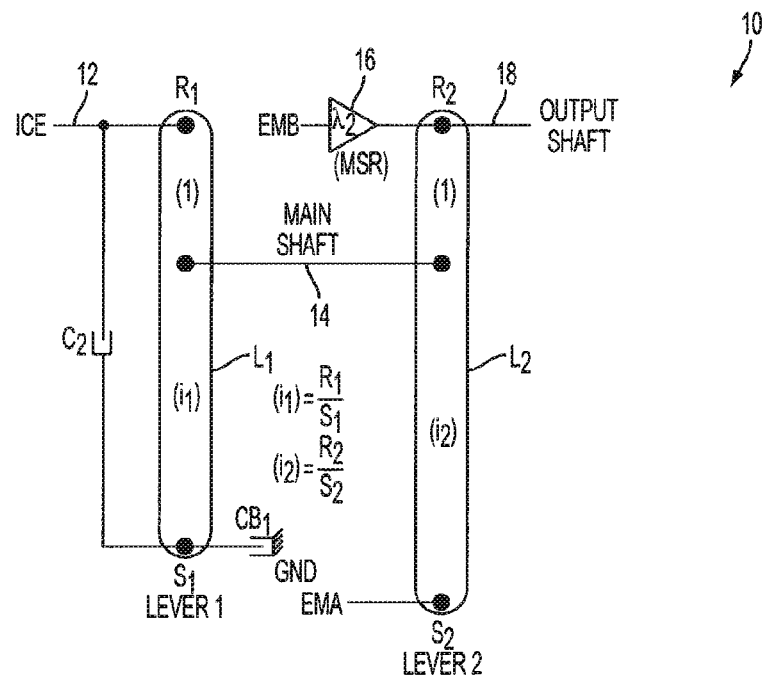
FIG. 1 is an illustration of a lever diagram of a drive system for a vehicle with an electrically variable transmission.

U.S. application Ser. No. 12/882,936; (the "'936 Application) filed Sep. 15, 2010 and titled "Multi-Speed Drive Unit" discloses various compound-input electrically variable transmissions ("EVT"), the disclosure incorporated herein by reference. U.S. application Ser. No. 13/188,799; filed Jul. 22, 2011 and titled "Clutch System for a Transmission", the disclosure incorporated herein by reference, discloses a clutch system that can be used e.g., in the '936 Application's multi-speed drive unit to create a two dry "clutch" drive system, similar to a DDCT (dual dry clutch transmission), for the drive unit. FIG. 1 is an example lever diagram of such a drive system 10.

A seen in FIG. 1, the drive system 10 includes a first planetary gear set represented by a first lever $L_1$ and a second planetary gear set represented by a second lever $L_2$. A ring gear $R_1$ of the first planetary gear set is connected to an internal combustion engine ICE via an input shaft 12. A sun gear $S_1$ of the first planetary gear set is connected to two clutches $CB_1$, $C_2$. In the illustrated example, the first clutch $CB_1$ is a braking mechanism that, when activated, grounds the sun gear $S_1$ to the drive unit's transaxle case. When activated, the second clutch $C_2$ connects the sun gear $S_1$ to the engine. An input brake is created when both clutches $CB_1$, $C_2$ activated at the same time.

The carriers of the planetary gear sets are connected via a main shaft 14. A sun gear $S_2$ of the second planetary gear set is connected to a first electric motor EMA. A ring gear $R_2$ of the second planetary gear set is connected to a second electric motor EMB via a motor speed reducer ("MSR") 16. The ring gear $R_2$ of the second planetary gear set is also connected to an output shaft 18. The motor speed reducer 16 controls the speed ratio between the second electric motor EMB and the output shaft 18.

The "936 Application discloses three input ratios. A first ratio is created by activating the first clutch $CB_1$ while deactivating the second clutch $C_2$. A second ratio is created by deactivating the first clutch $CB_1$ while activating the second clutch $C_2$. The third ratio is the input brake created by activating the first and second clutches $CB_1$, $C_2$. There is a need to control the drive system 10 to efficiently switch between drive modes and gear ratios to optimize the system's and vehicle's performance and to improve fuel economy.

Figure 2:
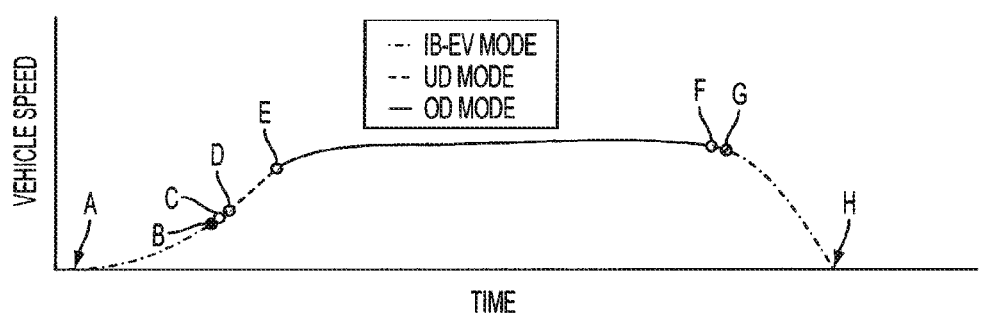
FIG. 2 is an illustration of an example drive cycle for a vehicle in accordance with the present disclosure.

FIG. 2 is an illustration of an example drive cycle for a vehicle containing a FIG. 1 drive system 10 and being controlled in accordance with the present disclosure. In the example, the vehicle accelerates from a stop, cruises at high speed and brakes to a stop. The various points and switching points of the drive cycle are listed in the table shown in FIG. 3.

During the cycle, the system 10 enters different modes to deliver the required output power from the electric motors and/or engine to the output shaft. The modes are chosen for best fuel economy and drive quality. The system 10 will operate in the following modes: input brake electric vehicle ("IB-EV"), under drive electric vehicle ("UD-EV"), over drive electric vehicle ("OD-EV"), under drive engine on ("UD-EO"), over drive engine on ("OD-EO"), and neutral (N). As shown in the table of FIG. 3, there are points and modes when the electric motors are propelling the vehicle without assistance from the engine (e.g., point A), propelling the vehicle with the assistance from the engine (e.g., points D to E) or providing regenerative braking (e.g., point G).

Both clutches $CB_1$ and $C_2$ will be applied (i.e., engaged or activated) to implement the IB-EV mode. The first clutch $CB_1$ will be applied while the second clutch $C_2$ is not applied (i.e., disengaged or deactivated) to implement the UD-EV and UD-EO modes. The first clutch $CB_1$ will not be applied while the second clutch $C_2$ is applied to implement the OD-EV and OD-EO modes. Both clutches $CB_1$ and $C_2$ will be disengaged in the neutral mode. It should be appreciated that this disclosure refers to the first clutch $CB_1$ as a braking clutch, but the disclosure is not limited to a braking clutch; as shown in the '936 Application, many clutches or synchronizers could be used in the system 10.

The aspects of the present disclosure are designed to control the electric motors EMA, EMB for optimal system operation during the entire drive cycle. The motor operation control method described herein is implemented on a controller or programmed processor in the drive system. In one preferred implementation, the aspects described herein will be implemented as part of a supervisory hybrid electric vehicle controller 802 (FIG. 8) such as the one described in U.S. application Ser. No. 61/513,061; filed Jul. 29, 2011 and titled "Engine Start Control System for an Electrically Variable Transmission", the disclosure incorporated herein by reference.

Figure 4:
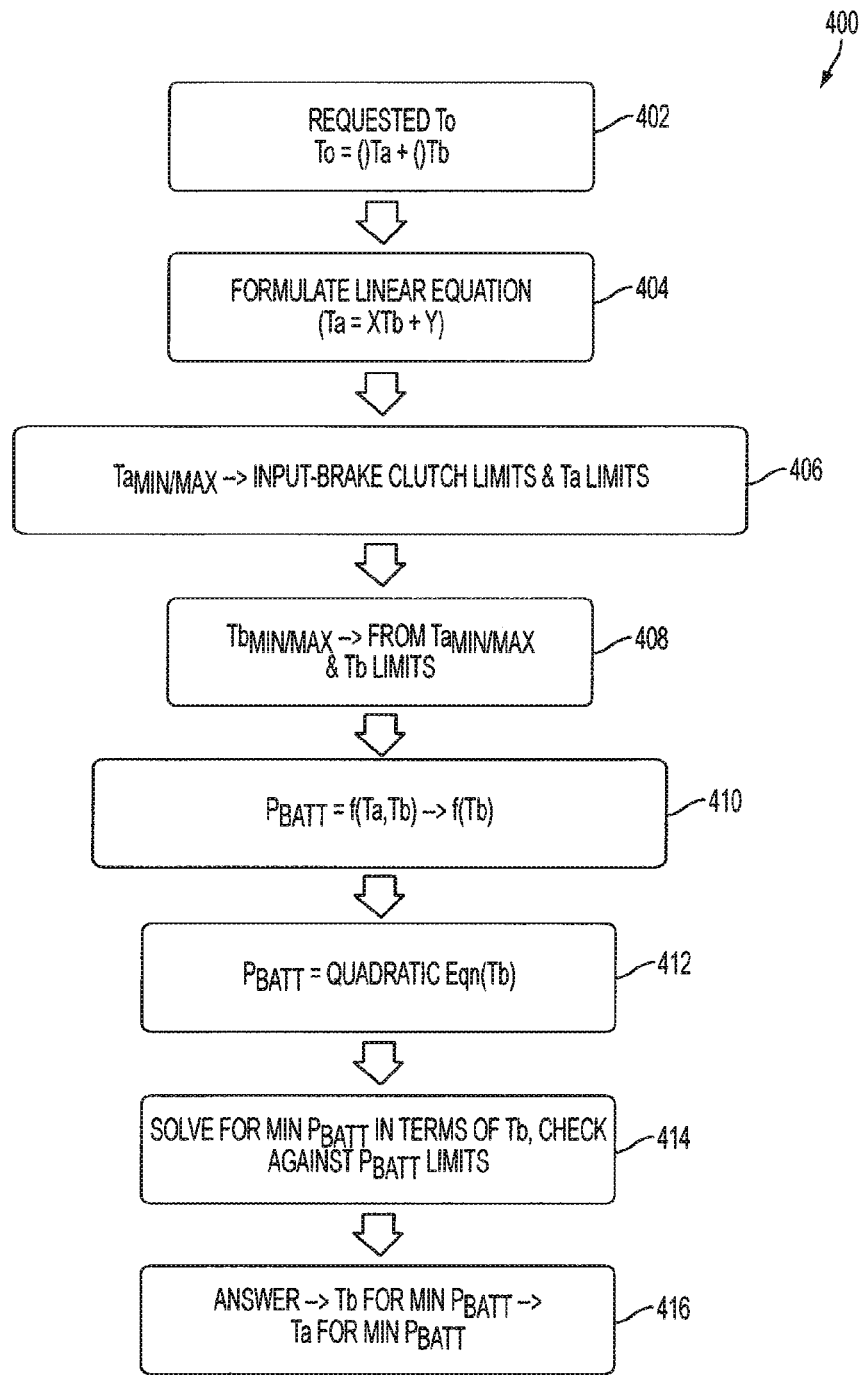
FIG. 4 is a flowchart of a motor operation control process in accordance with the present disclosure.

FIG. 4 illustrates a motor control process 400 in accordance with the disclosed principles. The illustrated process 400 includes some equation derivations (e.g., steps 402, 404, 410), which are steps that need only be performed once. The process 400 shall be used by the supervisory hybrid electric vehicle controller 800 to determine the transmission's optimum operating mode and to determine the final electric motor torques used during electric vehicle operation. The final electric motor torques will then be sent to the motor controllers 812, 814.

The process 400 illustrated in FIG. 4 is designed to find the motor torques Ta, Tb that minimize battery power Pbatt at each instant of calculation to achieve the requested output torque at the corresponding vehicle speed. The process 400 is designed to be run after an operating window within which the torque sources can operate is determined by a mode selection control process disclosed in U.S. Application no. 61/513,080; filed Jul. 29, 2011 and titled "Mode Selection Control System for an Electrically Variable Transmission," the disclosure incorporated herein by reference.

At step 402, the process 400 begins by determining that the requested output torque To is a function of the first electric motor torque Ta plus the second electric motor torque Tb. At step 404, a linear equation equating the first electric motor torque Ta to the second electric motor torque Tb is formulated as follows:

$$Ta = X Tb + Y \tag{1}$$

At step 406, a minimum electric motor A torque $Ta_{min}$ and a maximum electric motor A $Ta_{max}$ are determined based on the first clutch's limitations and torque limitations of the first electric motor EMA (based on the operating window discussed above). At step 408, a minimum electric motor B torque $Tb_{min}$ and a maximum electric motor B $Tb_{max}$ are determined based on the calculated minimum and maximum electric motor A torques $Ta_{min}$, $Ta_{max}$ and torque limitations of the second electric motor EMB (based on the operating window discussed above).

At step 410, the process 400 determines that the battery power Pbatt is a function of the two electric motor torques Ta, Tb. However, because of equation (1) above (step 404), step 410 can estimate the battery power Pbatt based solely as a function of the second electric motor's torque Tb. Step 412 determines the battery power Pbatt by solving a quadratic equation based on the second electric motor's torque Tb. Factors that are used to determine the battery power Pbatt are discussed below with reference to the process 500 illustrated in FIG. 5.

At step 414, the minimum battery power Pbatt based on the second electric motor's torque Tb is determined and compared against predetermined minimum and maximum battery power limits. If the determined battery power Pbatt is too low, step 414 will set the Pbatt to the minimum allowable battery power. If the determined battery power Pbatt is too high, step 414 will set the Pbatt to the maximum allowable battery power. At step 416, the electric motor torques Ta, Tb associated with the battery power Pbatt is determined and subsequently used to control the motor controllers 812, 814.

Figure 5:
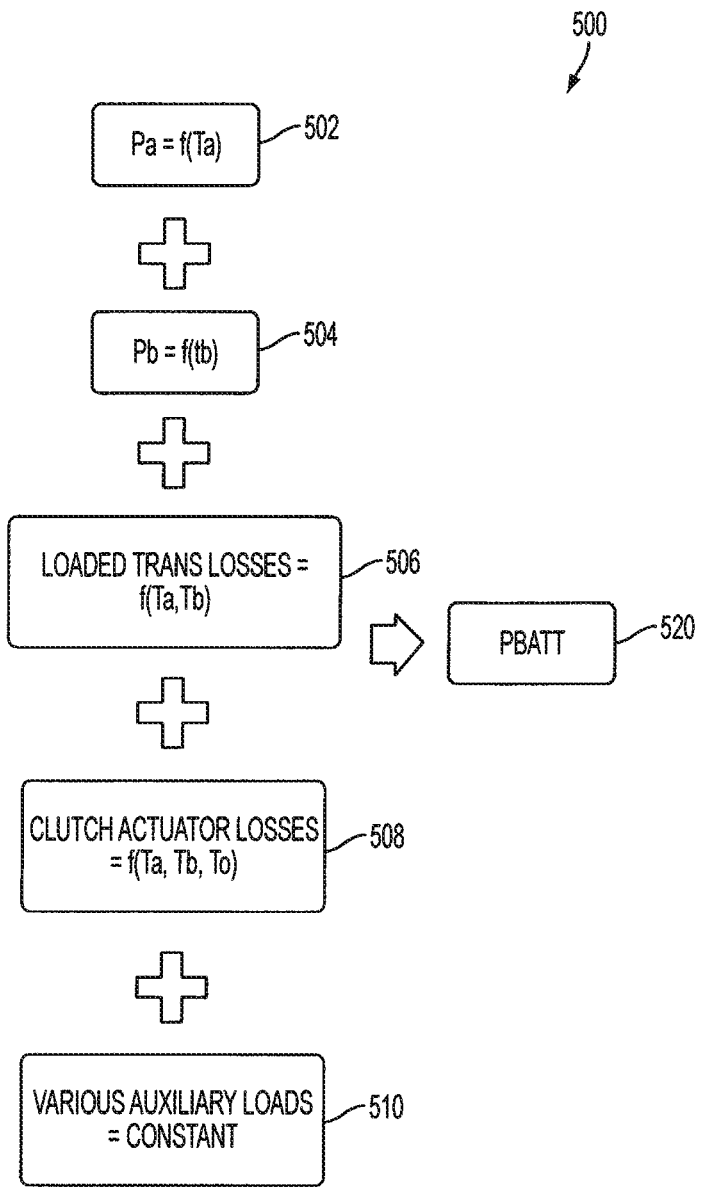
FIG. 5 illustrates an example calculation of battery power used by the FIG. 4 process in accordance with the present disclosure.

FIG. 5 illustrates the process 500 for calculating the battery power Pbatt in accordance with the present disclosure. The power attributed to the first electric motor Pa is determined as a function of the first electric motor torque Ta (step 502). The power attributed to the second electric motor Pb is determined as a function of the second electric motor torque Tb (step 504). Loaded transmission losses are determined as a function of both the first and second electric motor torques Ta, Tb (step 506). Clutch actuator losses are determined as a function of the first and second electric motor torques Ta, Tb and the output torque To (step 508). Various other auxiliary loads are set as constant values (step 510), which are added with the other determined values to create the battery power Pbatt (step 520).

Figure 6:
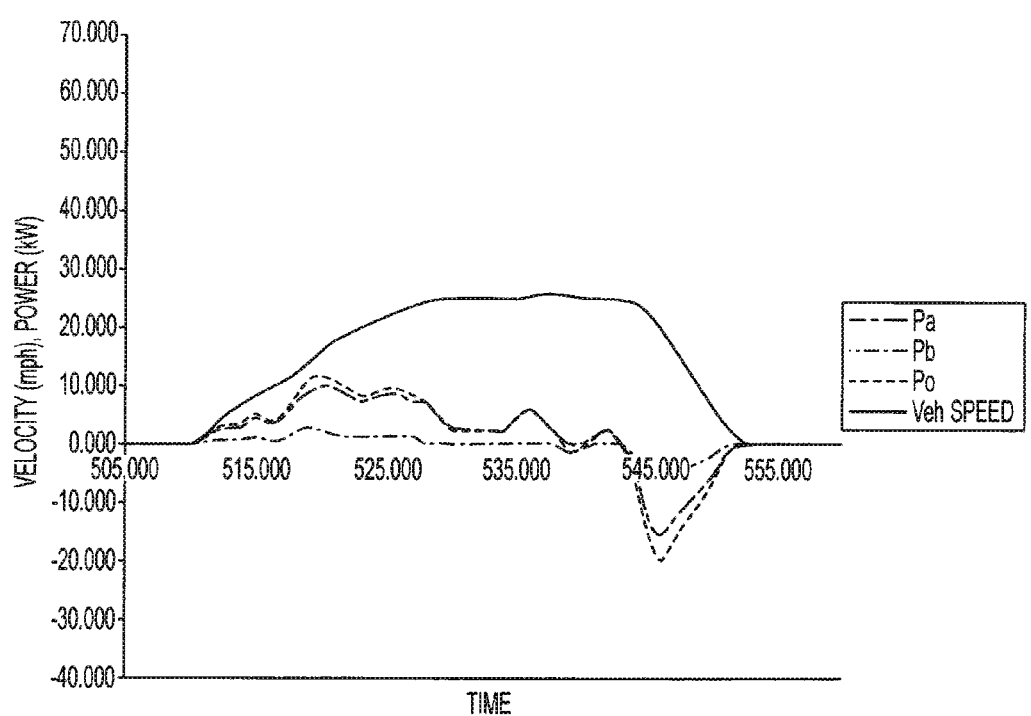
FIG. 6 is a graph showing electric motor A power, electric motor B power, output power and vehicle velocity versus time for a given drive cycle (e.g., the drive cycle of FIG. 2) in accordance with the principles disclosed herein.
Figure 7:
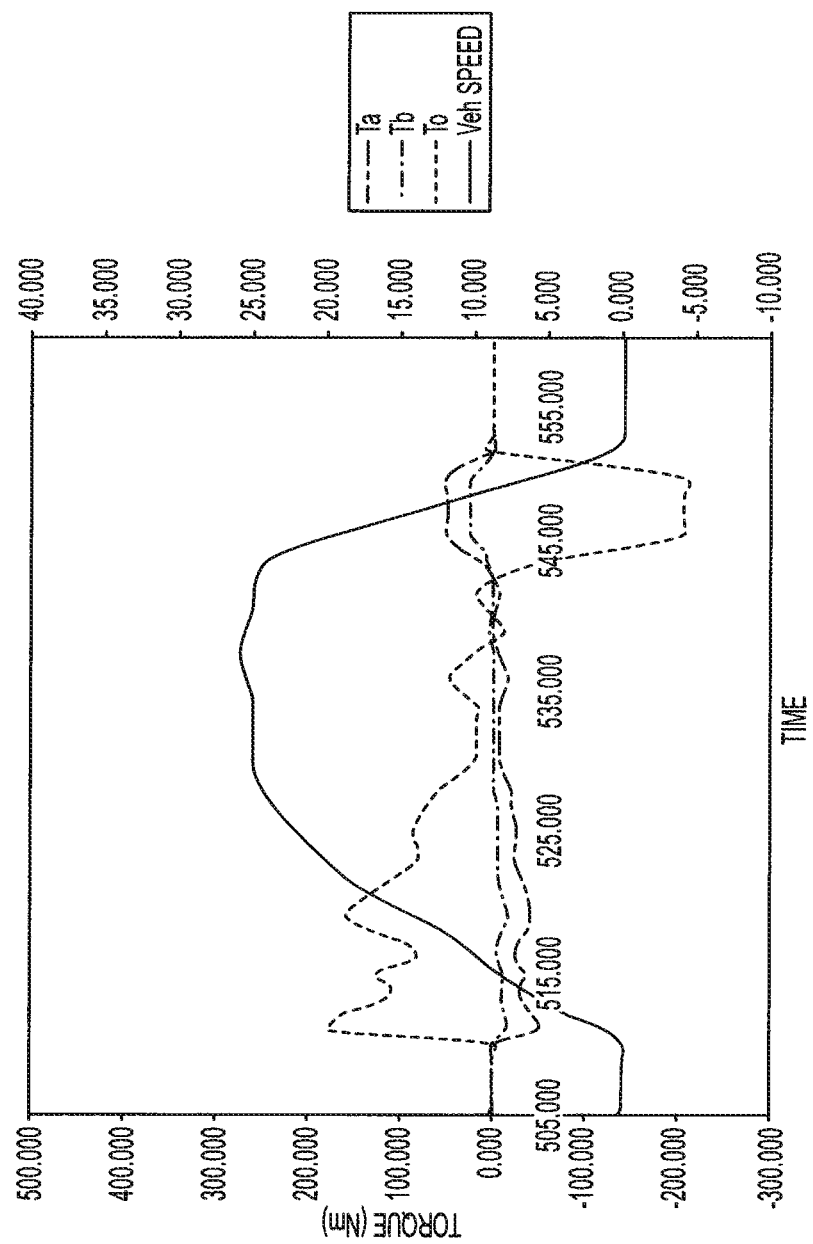
FIG. 7 is a graph showing electric motor A torque, electric motor B torque, output torque and vehicle velocity versus time for a given drive cycle (e.g., the drive cycle of FIG. 2) in accordance with the principles disclosed herein.

The disclosed motor control process 400 optimizes the use of the electric motors EMA, EMB such that both motors are operated at their corresponding points of minimum loss for electric vehicle tractive/propelling motion and electric vehicle regeneration (i.e., regenerative braking). FIG. 6 shows the results of the FIG. 4 process 400 in terms of electric motor A power Pa, electric motor B power Pb, output power Po and vehicle velocity versus time for a given drive cycle (e.g., the drive cycle of FIG. 2). FIG. 7 shows the results of the FIG. 4 process 400 in terms of electric motor A torque Ta, electric motor B torque Tb, output torque To, and vehicle velocity versus time for a given drive cycle (e.g., the drive cycle of FIG. 2).

Figure 8:
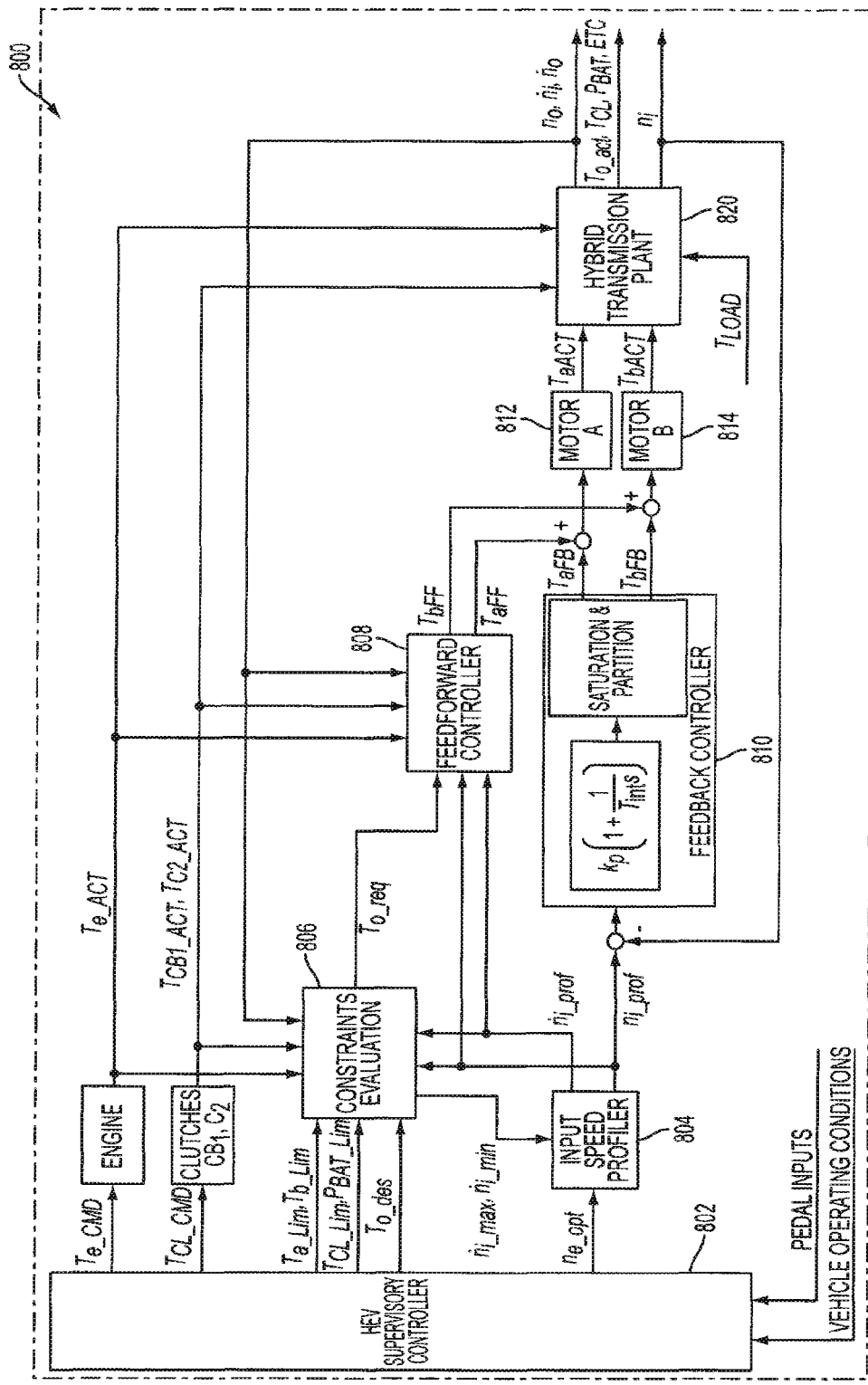
FIG. 8 is a block diagram of a portion of a vehicle's powertrain incorporating a controller for executing the methodology disclosed herein.

FIG. 8 is a block diagram of a portion of a vehicle's powertrain 800 incorporating a supervisory hybrid electric vehicle controller 802 for executing the process 400 disclosed herein. The powertrain 800 also includes an input speed profiler 804, a constraints evaluator 806, a feedforward controller 808, feedback controller 810, the engine, first and second clutches $CB_1$, $C_2$, first and second electric motor controllers 812, 814 for respectively controlling the first and second motors EMA, EMB, and a hybrid transmission plant 820. The supervisory hybrid electric vehicle controller 802 executes process 400 and inputs pedal position and the various other vehicle operating conditions and parameters discussed above with reference to process 400. Outputs from the supervisory hybrid electric vehicle controller 802 are used to control the engine, clutches $CB_1$, $C_2$ and the motors EMA, EMB (via the input speed profiler 804, constraints evaluator 806, feedforward controller 808, first and second motor controllers 812, 814, and the feedback controller 810) in accordance with the processes described herein. The other operations of the powertrain 800, including the input speed profiler 804, constraints evaluator 806, feedforward controller 808, the feedback controller 810, as well as the various parameters used by these components, are discussed in more detail in U.S. Application no. 61/513,061.

What is claimed is:

1. A method of controlling first and second electric motors of a vehicle having an electrically variable transmission, said method comprising using a processor to perform the steps of:
    determining minimum and maximum torque limits for the second electric motor;
    determining a minimum battery power as a function of a torque of the second electric motor, and not the first electric motor;
    setting the torque of the second electric motor based on the determined minimum battery power; and
    setting a torque of the first electric motor based on the determined minimum battery power.

2. The method of claim 1, further comprising determining minimum and maximum torque limits for the first electric motor, wherein the act of determining the minimum and maximum torque limits for the second electric motor is based in part on the determined minimum and maximum torque limits for the first electric motor and additional torque limitations of the second electric motor.

3. The method of claim 2, wherein minimum and maximum torque limits for the first electric motor are based on input brake clutch limits and additional torque limitations of the first electric motor.

4. The method of claim 1 further comprising the act of ensuring that the determined minimum battery power falls within an allowable battery power range.

5. The method of claim 4, wherein the determined minimum battery power is set to a minimum battery power threshold when the determined minimum battery power is less than the minimum battery power threshold.

6. The method of claim 4, wherein the determined minimum battery power is set to a maximum battery power threshold when the determined minimum battery power is greater than the maximum battery power threshold.

7. The method of claim 1, wherein the act of determining the minimum battery power further comprises:
    adding a battery power associated with running the first electric motor to a battery power associated with running the second electric motor.

8. The method of claim 1, wherein the act of determining the minimum battery power further comprises:
    determining a battery power associated with running the first electric motor;
    determining a battery power associated with running the second electric motor;
    determining loaded transmission losses;
    determining actuator losses;
    determining auxiliary loads; and
    summing the determined battery power associated with running the first electric motor, the determined battery power associated with running the second electric motor, the determined load transmission losses, the determined actuator losses and the determined auxiliary loads.

9. A controller for controlling first and second electric motors of a vehicle having an electrically variable transmission, said controller comprising:
    a processor programmed to:
        determine minimum and maximum torque limits for the second electric motor;
        determine a minimum battery power as a function of a torque of the second electric motor, and not the first electric motor;
        set the torque of the second electric motor based on the determined minimum battery power; and
        set a torque of the first electric motor based on the determined minimum battery power.

10. The controller of claim 9, wherein the processor is further programmed to determine minimum and maximum torque limits for the first electric motor, and
    wherein the processor determines the minimum and maximum torque limits for the second electric motor based in part on the determined minimum and maximum torque limits for the first electric motor and additional torque limitations of the second electric motor.

11. The controller of claim 10, wherein minimum and maximum torque limits for the first electric motor are based on input brake clutch limits and additional torque limitations of the first electric motor.

12. The controller of claim 9, wherein said processor is further programmed to ensure that the determined minimum battery power falls within an allowable battery power range.

13. The controller of claim 12, wherein said processor sets the determined minimum battery power to a minimum battery power threshold when the determined minimum battery power is less than the minimum battery power threshold.

14. The controller of claim 12, wherein said processor sets the determined minimum battery power to a maximum battery power threshold when the determined minimum battery power is greater than the maximum battery power threshold.

15. The controller of claim 9, wherein said processor determines the minimum battery power by adding a battery power associated with running the first electric motor to a battery power associated with running the second electric motor.

16. The controller of claim 9, wherein said processor determines the minimum battery power by:

determining a battery power associated with running the first electric motor;
determining a battery power associated with running the second electric motor;
determining loaded transmission losses;
determining actuator losses;
determining auxiliary loads; and
summing the determined battery power associated with running the first electric motor, the determined battery power associated with running the second electric motor, the determined load transmission losses, the determined actuator losses and the determined auxiliary loads.

* * * * *